US 10,367,401 B2

(12) United States Patent
Tamura et al.

(10) Patent No.: US 10,367,401 B2
(45) Date of Patent: Jul. 30, 2019

(54) ELECTRIC MOTOR WITH COMMUTATOR SEGMENTS, ANODE AND CATHODE BRUSHES AND COILS HAVING VARYING NUMBER OF TURNS BASED ON ANODE BRUSH POSITION ANGLE

(71) Applicant: MITSUBA CORPORATION, Kiryu-shi, Gumna (JP)

(72) Inventors: Natsumi Tamura, Kiryu (JP); Hiroto Tanaka, Kiryu (JP); Teppei Tokizaki, Kiryu (JP); Satoshi Tamura, Kiryu (JP)

(73) Assignee: Mitsuba Corporation, Gunma (JP)

( * ) Notice: Subject to any disclaimer, the term of this patent is extended or adjusted under 35 U.S.C. 154(b) by 458 days.

(21) Appl. No.: 15/112,537

(22) PCT Filed: Mar. 5, 2015

(86) PCT No.: PCT/JP2015/056494
§ 371 (c)(1),
(2) Date: Jul. 19, 2016

(87) PCT Pub. No.: WO2015/137230
PCT Pub. Date: Sep. 17, 2015

(65) Prior Publication Data
US 2016/0344273 A1     Nov. 24, 2016

(30) Foreign Application Priority Data
Mar. 14, 2014    (JP) ................................ 2014-052304

(51) Int. Cl.
*H02K 23/00*      (2006.01)
*H02K 23/38*      (2006.01)
(Continued)

(52) U.S. Cl.
CPC ............... *H02K 23/38* (2013.01); *H02K 1/17* (2013.01); *H02K 1/24* (2013.01); *H02K 1/26* (2013.01);
(Continued)

(58) Field of Classification Search
CPC .......... H02K 23/38; H02K 23/26; H02K 1/17; H02K 1/24; H02K 1/26; H02K 3/18;
(Continued)

(56) References Cited

U.S. PATENT DOCUMENTS 2,509,746 A * 5/1950 Thomas ................. H02K 23/26
                                                                                     310/203
4,243,902 A * 1/1981 Ban ....................... H02K 23/26
                                                                                    310/154.05
(Continued)

FOREIGN PATENT DOCUMENTS

| CN | 101465586 A | 6/2009 | |
| JP | H11178300 | * 12/1997 | ............. H02K 23/38 |

(Continued)

OTHER PUBLICATIONS

JPH11178300 English Translation (in IDS Dating Dec. 6, 2017).*
(Continued)

*Primary Examiner* — Bernard Rojas
*Assistant Examiner* — Maged M Almawri
(74) *Attorney, Agent, or Firm* — Wood Herron & Evans LLP (57) ABSTRACT

In a 4-pole, 6-slot, 18-segment electric motor, one forward winding coil (91) and two reverse winding coils (92, 93) are wound on each tooth (12). When the forward winding coils are formed of coils corresponding to a U phase, a V phase, and a W phase and the reverse winding coils are formed of coils corresponding to a "–U" phase, a "–V" phase, and a "–W" phase, the coils, which correspond to a U phase, a
(Continued)

"−W" phase, a "−W" phase, a V phase, a "−U" phase, a "−U" phase, a W phase, a "−V" phase, and a "−V" phase, are electrically connected in this order between the adjacent segments. When the number of turns of the coils (91) corresponding to a U phase, a V phase, and a W phase is denoted by T1, the number of turns of the coils (92), which correspond to a "−U" phase, a "−V" phase, and a "−W" phase and first come into sliding contact with a brush, is denoted by T2, and the number of turns of the coils (93), which correspond to a "−U" phase, a "−V" phase, and a "−W" phase and later come into sliding contact with the brush, is denoted by T3, "T2>T1>T3" is satisfied.

6 Claims, 9 Drawing Sheets (51) Int. Cl.
| | |
|---|---|
| *H02K 3/18* | (2006.01) |
| *H02K 3/28* | (2006.01) |
| *H02K 1/17* | (2006.01) |
| *H02K 1/24* | (2006.01) |
| *H02K 1/26* | (2006.01) |
| *H02K 3/12* | (2006.01) |
| *H02K 7/08* | (2006.01) |
| *H02K 7/10* | (2006.01) |
| *H02K 13/00* | (2006.01) |
| *H02K 23/26* | (2006.01) |
| *H02K 7/116* | (2006.01) |

(52) U.S. Cl.
CPC ............... *H02K 3/12* (2013.01); *H02K 3/18* (2013.01); *H02K 3/28* (2013.01); *H02K 7/08* (2013.01); *H02K 7/10* (2013.01); *H02K 13/006* (2013.01); *H02K 23/26* (2013.01); *H02K 7/1166* (2013.01); *H02K 2213/03* (2013.01)

(58) Field of Classification Search
CPC .. H02K 3/28; H02K 7/08; H02K 7/10; H02K 7/1166; H02K 2213/03; H02K 13/006
USPC .... 310/154, 49.52, 128, 137, 180–208, 151, 310/148, 149, 225, 135, 136, 144, 224
See application file for complete search history.

(56) References Cited

U.S. PATENT DOCUMENTS

| | | | | |
|---|---|---|---|---|
| 4,315,177 A * | 2/1982 | Ban | ........................ | H02K 23/26 310/154.05 |
| 4,447,751 A * | 5/1984 | Ban | ........................ | H02K 29/08 310/154.05 |
| 4,583,016 A * | 4/1986 | Ban | ........................ | H02K 23/26 310/154.05 |
| 4,847,526 A * | 7/1989 | Takehara | ................ | H02K 1/146 310/185 |
| 4,933,586 A * | 6/1990 | Gotou | .................... | H02K 23/30 310/198 |
| 5,044,065 A * | 9/1991 | Dyke | ..................... | H02K 13/04 29/597 |
| 5,191,257 A * | 3/1993 | Sugiyama | .............. | H02K 23/32 310/198 |
| 7,619,344 B2 * | 11/2009 | Osawa | .................... | H02K 23/28 310/198 |
| 9,496,771 B2 * | 11/2016 | Kawashima | ........... | H02K 23/04 |
| 2004/0145268 A1* | 7/2004 | Yamamoto | ............. | H02K 13/10 310/249 |
| 2012/0086297 A1* | 4/2012 | Makino | ................... | H02K 23/30 310/203 |

FOREIGN PATENT DOCUMENTS

| | | | | |
|---|---|---|---|---|
| JP | 11178300 A | | 7/1999 | |
| JP | 3047544 B | | 5/2000 | |
| JP | 2000341892 A | | 12/2000 | |
| JP | 2007189870 A | | 7/2007 | |
| JP | 2013038985 A | | 2/2013 | |
| WO | 2013015409 A1 | | 1/2013 | |
| WO | WO-2013015409 A1 * | | 1/2013 | ............. H02K 23/04 |

OTHER PUBLICATIONS

Japanese Patent Office; Search Report in International Patent Application No. PCT/JP2015/056494 dated May 19, 2015; 3 pages.
Chinese Patent Office, Office Action issued in Chinese Patent Application No. CN 201580012749.0 dated Jan. 19, 2018, 8 pages.
European Patent Office, Search Report issued in European Patent Application No. 15761469.4 dated Nov. 8, 2017, 13 pages.

* cited by examiner

ELECTRIC MOTOR WITH COMMUTATOR SEGMENTS, ANODE AND CATHODE BRUSHES AND COILS HAVING VARYING NUMBER OF TURNS BASED ON ANODE BRUSH POSITION ANGLE

TECHNICAL FIELD

The present invention relates to an electric motor.

Priority is claimed on Japanese Patent Application No. 2014-052304, filed Mar. 14, 2014, the content of which is incorporated herein by reference.

BACKGROUND ART

For example, a DC motor with a brush, in which motor magnets are disposed on the inner peripheral surface of a bottomed cylindrical yoke and an armature is rotatably provided on the inside of the motor magnets in a radial direction, is known as an electric motor (for example, see PTL 1).

The armature includes an armature core, armature coils, and a commutator. The armature core includes a plurality of teeth that are provided on the outer periphery of an annular core body externally fitted and fixed to a rotating shaft and radially extend outward in the radial direction. The armature coil is wound on each tooth of the armature core via a slot between the teeth. The commutator is provided on the rotating shaft so as to rotate integrally with the armature core.

The commutator includes a plurality of segments that are disposed side by side in a circumferential direction in a state in which the segments are insulated from each other. Terminal portions of the respective armature coils are connected to these segments.

Further, a plurality of brushes come into sliding contact with the segments. When DC current is supplied to each armature coil through the segment by the brushes, the armature and the rotating shaft are rotated by a magnetic attractive force or a repelling force that is generated between a magnetic field formed on the armature core and the motor magnets. Since the segments with which the brushes come into sliding contact are sequentially changed by the rotation of the armature and the rotating shaft, the switching of the direction of current flowing in the armature coil, that is, so-called rectification is performed. Then, the armature is continuously rotated and a rotational output is taken out of the rotating shaft.

Incidentally, when the commutator rotates, the brushes repeatedly come into contact with the segments and are repeatedly separated from the segments. For this reason, since electric discharge is generated at the time of the separation of the brushes from the segments when a voltage between the segments is high, the lifespan of the brushes are shortened. As means for preventing this, there is, for example, a method of making the number of the segments of the commutator larger than the number of the teeth of the armature core.

CITATION LIST

Patent Literature

[PTL 1] Japanese Patent No. 3047544

SUMMARY OF INVENTION

Technical Problem

Incidentally, in a case in which the number of segments is increased to three times the number of teeth and the number of coils for each tooth is set to three, magnetomotive force vectors generated from three coils wound on the same tooth do not correspond to each other and a delay-angle coil, a coil having no advance angle, and an advance-angle coil are formed. For this reason, there is a possibility that rectification may deteriorate.

An object of the invention is to provide an electric motor that can lengthen the lifespan of brushes by the improvement of rectification performance.

Solution to Problem

According to a first aspect of the invention, an electric motor includes: a motor magnet in which a plurality of magnetic poles are arranged in a circumferential direction; a rotating shaft that is rotatably provided inside the motor magnet; an armature core that is mounted on the rotating shaft and includes a plurality of teeth radially extending outward in a radial direction and a plurality of slots formed between the teeth; coils that are wound on each of the teeth in a concentrated winding manner; a commutator which is provided so as to rotate integrally with the rotating shaft and on which a plurality of segments are disposed in the circumferential direction; and an anode brush and a cathode brush that supply power to the coils through the segments. Three coils are wound on each of the teeth, and the number of turns of one coil among the three coils is set to be smaller than the number of turns of each of the other two coils.

According to a second aspect of the invention, in the electric motor according to the first aspect of the invention, the number of the magnetic poles is set to four, the number of the slots is set to six, and the number of the segments is set to eighteen; and the three coils wound on each tooth are formed of one forward winding coil that is wound in a forward direction and two reverse winding coils wound in a reverse direction. Further, when a U phase, a V phase, and a W phase are assigned to each tooth in this order in the circumferential direction, the forward winding coils wound to the respective phases are respectively referred to as a U phase, a V phase, and a W phase, and the reverse winding coils wound to the respective phases are respectively referred to as a −U phase, a −V phase, and a −W phase, the coils of the U phase, the −W phase, the −W phase, the V phase, the −U phase, the −U phase, the W phase, the −V phase, and the −V phase are electrically connected in this order between the adjacent segments. Furthermore, the number of turns of one coil among the one forward winding coil and the two reverse winding coils, which are wound, is set to be smaller than the number of turns of each of the other two coils.

According to a third aspect of the invention, in the electric motor according to the first or second aspect of the invention, the three coils are an advance-angle coil of which a magnetomotive force vector is directed to an advance-angle side, a delay-angle coil of which a magnetomotive force vector is directed to a delay-angle side, and a normal coil of which a magnetomotive force vector is not directed to either the advance-angle side or the delay-angle side. Further, when the number of turns of the advance-angle coil is denoted by T1, the number of turns of the normal coil is denoted by T2, and the number of turns of the delay-angle coil is denoted by T3 in a case an advance angle θ1 of the magnetomotive force vector of the advance-angle coil satisfies 0°<θ1≤20°, a delay angle θ2 of the magnetomotive force vector of the delay-angle coil satisfies 0°<θ2≤20°, and an advance angle θ3 of the position of the anode brush satisfies 0°≤θ3≤3°, T1, T2, and T3 are set so as to satisfy T2 >T1>T3.

According to a fourth aspect of the invention, in the electric motor according to the first or second aspect of the invention, the three coils are an advance-angle coil of which a magnetomotive force vector is directed to an advance-angle side, a delay-angle coil of which a magnetomotive force vector is directed to a delay-angle side, and a normal coil of which a magnetomotive force vector is not directed to either the advance-angle side or the delay-angle side. Further, when the number of turns of the advance-angle coil is denoted by T1, the number of turns of the normal coil is denoted by T2, and the number of turns of the delay-angle coil is denoted by T3 in a case an advance angle θ1 of the magnetomotive force vector of the advance-angle coil satisfies 0°<θ1≤20°, a delay angle θ2 of the magnetomotive force vector of the delay-angle coil satisfies 0°<θ2≤20°, and an advance angle θ3 of the position of the anode brush satisfies 3°<θ3≤10°, T1, T2, and T3 are set so as to satisfy T2>T3≤T1.

According to a fifth aspect of the invention, in the electric motor according to the first or second aspect of the invention, the three coils are an advance-angle coil of which a magnetomotive force vector is directed to an advance-angle side, a delay-angle coil of which a magnetomotive force vector is directed to a delay-angle side, and a normal coil of which a magnetomotive force vector is not directed to either the advance-angle side or the delay-angle side. Further, when the number of turns of the advance-angle coil is denoted by T1 , the number of turns of the normal coil is denoted by T2, and the number of turns of the delay-angle coil is denoted by T3 in a case an advance angle θ1 of the magnetomotive force vector of the advance-angle coil satisfies 0°<θ1≤20°, a delay angle θ2 of the magnetomotive force vector of the delay-angle coil satisfies 0°<θ2≤20°, and an advance angle θ3 of the position of the anode brush satisfies θ3=20°, T1, T2, and T3 are set so as to satisfy T3>T2>T1.

Advantageous Effects of Invention

According to the electric motor, since the number of turns of one coil is set to be smaller than the number of turns of each of the other two coils, it is possible to reduce an influence of the deterioration of rectification performance that is caused by the discordance of the magnetomotive force vectors generated by the three coils. Further, it is possible to lengthen the lifespan of the brushes by the improvement of rectification.

DESCRIPTION OF EMBODIMENTS

First Embodiment
(Motor with Speed Reducer)
Next, an embodiment of the invention will be described with reference to the drawings.

Figure 1:
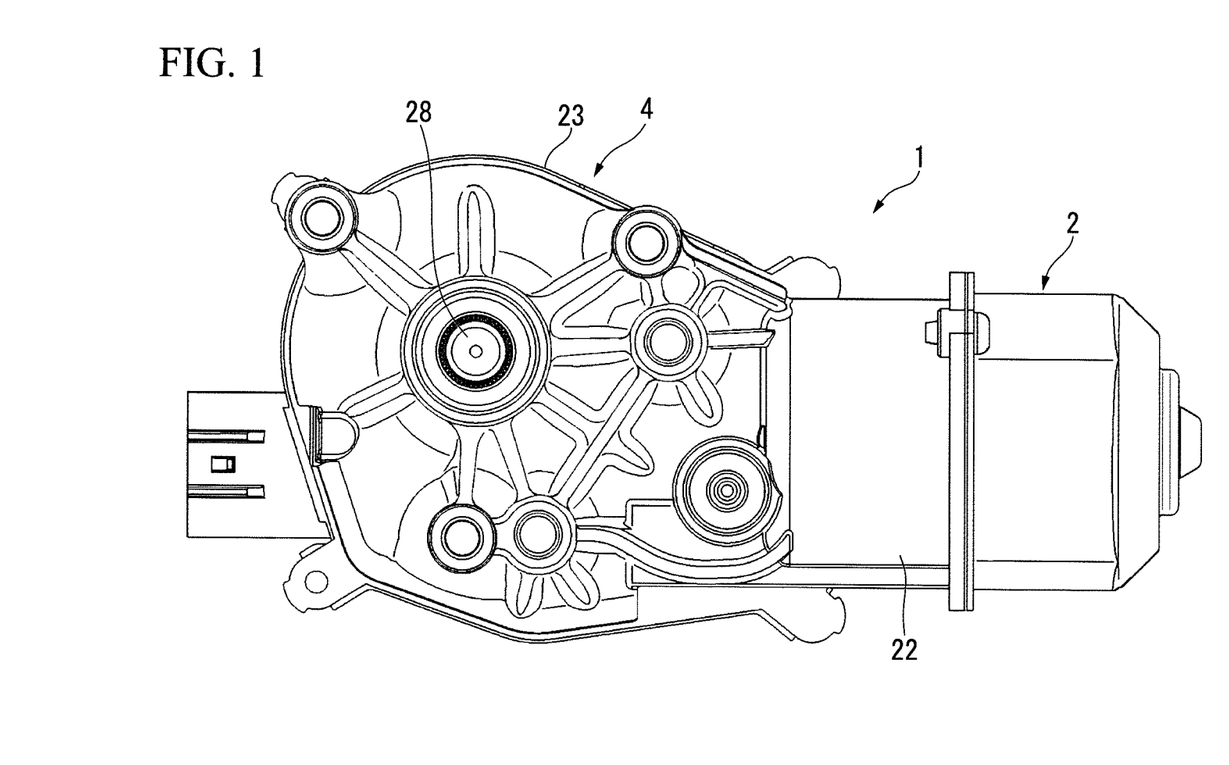
FIG. 1 is a side view showing the appearance of a motor with a speed reducer of an embodiment of the invention.
Figure 2:
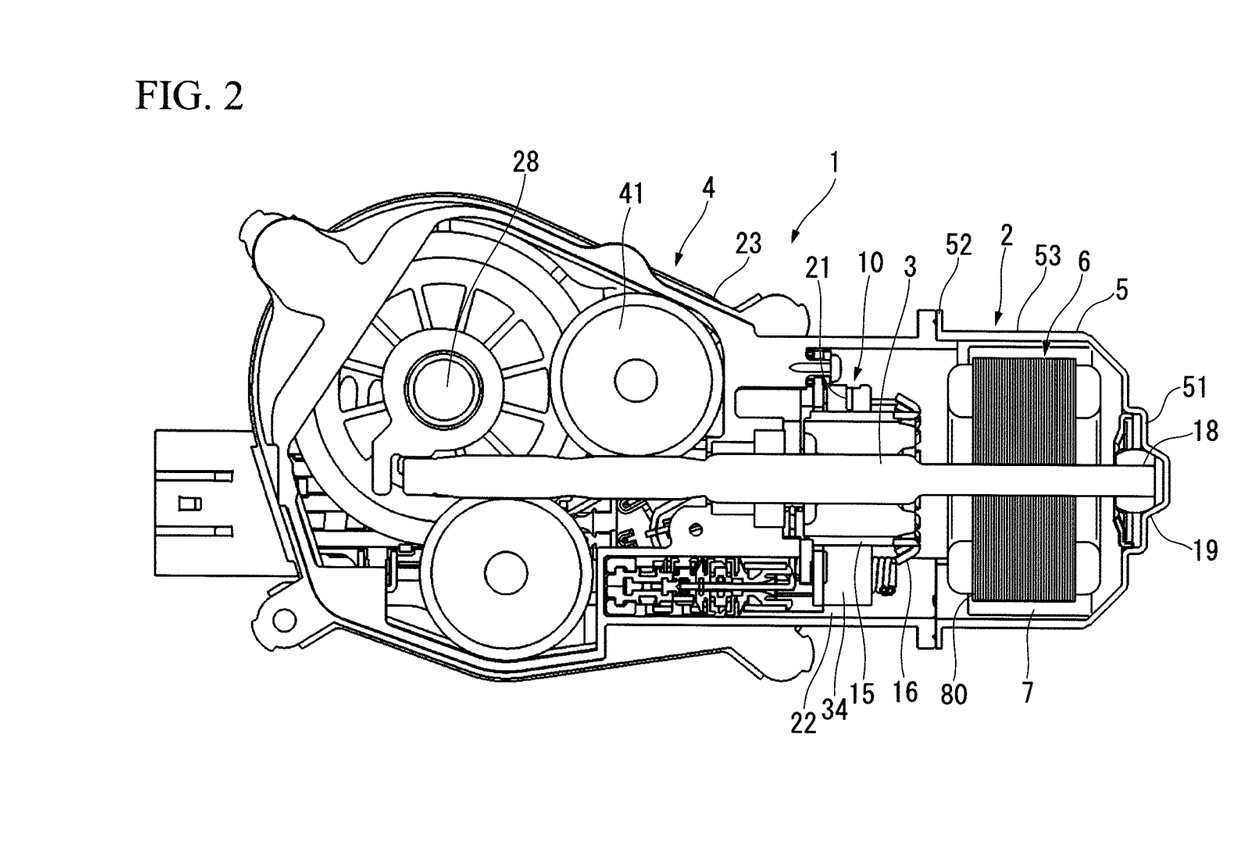
FIG. 2 is a longitudinal sectional view of the motor with a speed reducer of the embodiment of the invention.

FIG. 1 is a side view showing the appearance of a motor with a speed reducer to which an electric motor according to the invention is applied. FIG. 2 is a longitudinal sectional view of the motor with a speed reducer.

As shown in FIGS. 1 and 2, a motor 1 with a speed reducer is used to drive, for example, windshield wipers of an automobile. The motor 1 with a speed reducer includes an electric motor 2 and a speed reduction mechanism 4 that is connected to a rotating shaft 3 of the electric motor 2. The electric motor 2 includes a yoke 5 that also functions as a bottomed cylindrical motor housing and an armature 6 that is rotatably provided in the yoke 5.

A cylinder portion 53 of the yoke 5 is formed in a substantially cylindrical shape, and a motor magnet 7 is provided on the inner peripheral surface of the cylinder portion 53. Four magnetic poles are arranged on the inner peripheral surface of the motor magnet 7 so that N poles and S poles are alternated in a circumferential direction.

A bearing housing 19, which protrudes outward in an axial direction, is formed at a radially central portion of a bottom wall (an end portion) 51 of the yoke 5, and a sliding bearing 18, by which one end of the rotating shaft 3 is rotatably supported, is provided in the bearing housing 19. The sliding bearing 18 has a function to align the rotating shaft 3.

An outer flange 52 is provided at an opening of the cylinder portion 53, and an end portion of a gear housing 23 of the speed reduction mechanism 4 is fixed to the outer flange 52. Accordingly, the electric motor 2 and the speed reduction mechanism 4 are integrally connected to each other.

Figure 3:
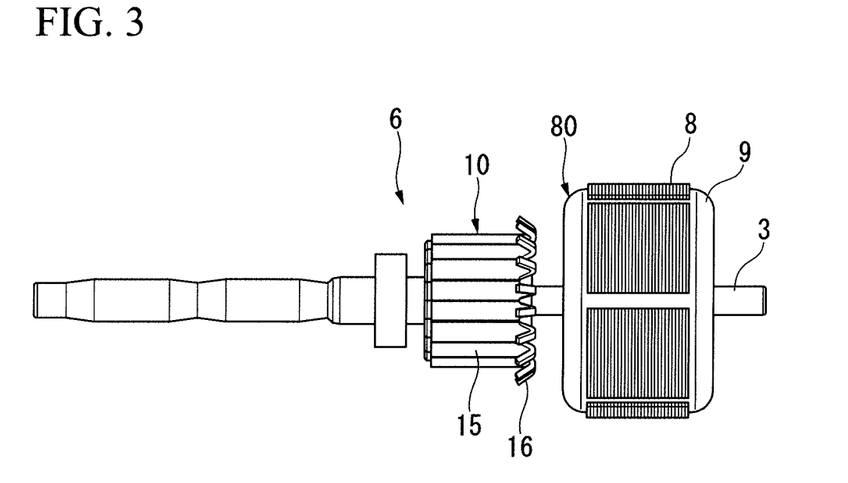
FIG. 3 is a side view of an armature of the embodiment of the invention.

(Armature)
FIG. 3 is a side view showing the appearance of the armature.

As shown in FIGS. 2 and 3, the armature 6 includes an armature body 80 that is externally fitted and fixed to the rotating shaft 3, and a commutator 10 that is disposed at the other end side of the rotating shaft 3 (the speed reduction mechanism 4 side of the rotating shaft 3).

The armature body 80 includes an armature core 8 and an armature coil 9 that is wound on the armature core 8. The armature core 8 is formed of a laminated core in which core plates punched by pressing or the like and made of a magnetic material are laminated in the axial direction, or a dust core that is press-molded with soft magnetic powder.

Figure 5:
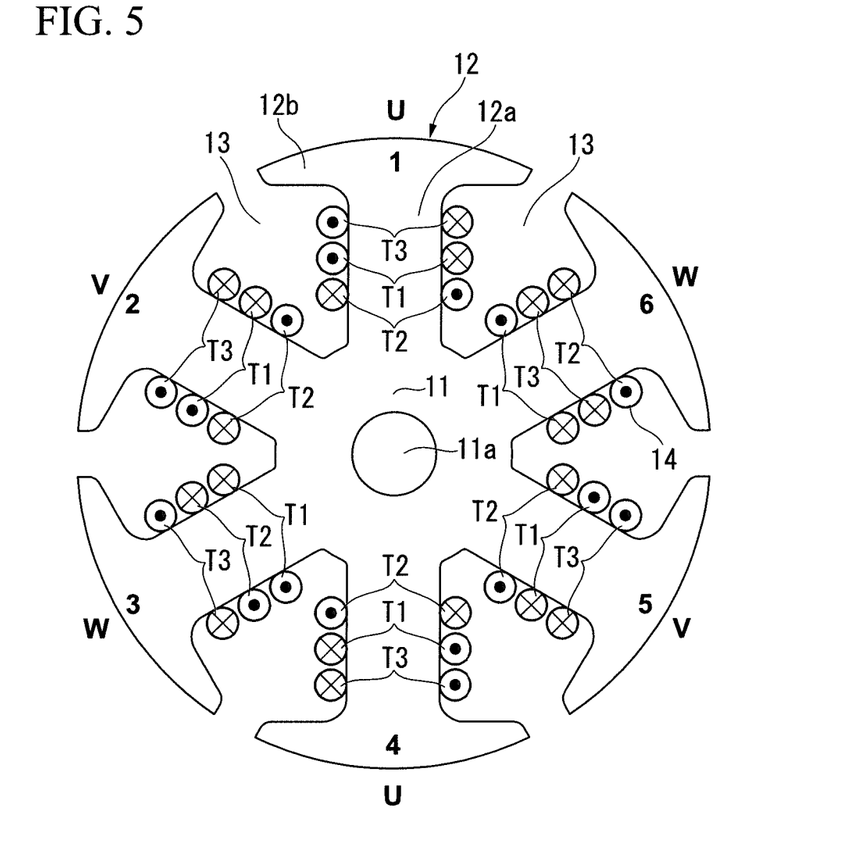
FIG. 5 is a view showing the winding direction of a winding wire of the embodiment of the invention.

(Armature Core)
As shown in FIG. 5, an armature core 8 includes an annular core body 11. A through hole 11a into which the rotating shaft 3 is press-fitted is formed at the center of the core body 11. Further, six teeth 12 are radially provided on the outer peripheral portion of the core body 11 at regular intervals in the circumferential direction. Each of the teeth 12 is formed in a substantially T shape in a plan view when seen in the axial direction. Each of the teeth 12 includes a winding drum part 12a that radially protrudes from the core body 11 in the radial direction, and a flange portion 12b that extends from the end of the winding drum part 12a in the circumferential direction and forms the outer periphery of the armature core 8.

According to this structure, six slots 13 are formed between adjacent teeth 12. Further, winding wires 14 coated with enamel pass through these slots 13 and the winding wires 14 are wound on the outer peripheries of the winding drum parts 12a of the teeth 12 in a concentrated winding manner, so that the armature coil 9 is formed (the detail of a method of forming the armature coil 9 will be described below).

(Commutator)

Next, another structure of the armature will be described.

As shown in FIGS. 2 and 3, the commutator 10 is externally fitted and fixed to a side of the rotating shaft 3 closer to the other end side of the rotating shaft 3 (the speed reduction mechanism 4 side of the rotating shaft 3) than the armature core 8. A plurality of segments 15, which are made of a conductive material, are mounted on the outer peripheral surface of the commutator 10. Eighteen segments 15, of which the number is three times the number of the teeth 12 and the slots 13 of the armature core 8, are mounted. The segment 15 is formed of a plate-like metal piece that is long in the axial direction, and the segments 15 are fixed in parallel at regular intervals in the circumferential direction in a state in which the segments 15 are insulated from each other. As described above, the electric motor 2 is formed as a so-called 4-pole, 6-slot, 18-segment electric motor of which the number of magnetic poles is set to four, the number of slots 13 is set to six, and the number of segments 15 is set to eighteen.

Further, a riser 16, which is bent so as to be folded back toward the outer diameter side, is molded integrally with an end portion of each segment 15 facing the armature core 8. Terminal portions of the armature coil 9 are wound around the risers 16 and are fixed to the risers 16 by fusing or the like. Accordingly, the segment 15 and the armature coil 9 corresponding thereto are electrically connected to each other.

As shown in FIG. 1, the commutator 10 having the above-mentioned structure faces the gear housing 23 of the speed reduction mechanism 4. A gear group 41 of the speed reduction mechanism 4 is housed in the gear housing 23. Further, a brush housing portion 22 is molded integrally with the side of the gear housing 23 facing the electric motor 2, and the commutator 10 of the electric motor 2 faces the brush housing portion 22.

A brush 21 is housed in the brush housing portion 22 so as to freely protrude/recede through a holder stay or a brush holder (not shown). The brush 21 is used to supply power from an external power source (for example, a battery mounted on an automobile, or the like) to the commutator 10. The brush 21 is biased toward the commutator 10 by a spring (not shown), and an end of the brush 21 comes into sliding contact with the segments 15.

The brush 21 includes a low-speed brush (an anode brush) 21a and a high-speed brush (an anode brush) 21b that are connected to an anode, and a common brush (a cathode brush) 21c that is connected to a cathode used in common to the low-speed brush 21a and the high-speed brush 21b. The low-speed brush 21a and the common brush 21c are disposed at an interval of 90° as a mechanical angle in a circumferential direction so as to correspond to the magnetic pole pitch of the motor magnet 7 (an electrical angle of) 180°. On the other hand, the high-speed brush 21b is disposed at a position that is advanced from the common brush 21c by an angle slightly larger than the magnetic pole pitch of the motor magnet 7. Additionally, the advance angle of the high-speed brush 21b is set to, for example, 30°.

(Method of Forming Armature Coil)

Next, an example of a method of forming the armature coil 9 will be described with reference to FIGS. 4 and 5.

Figure 4:
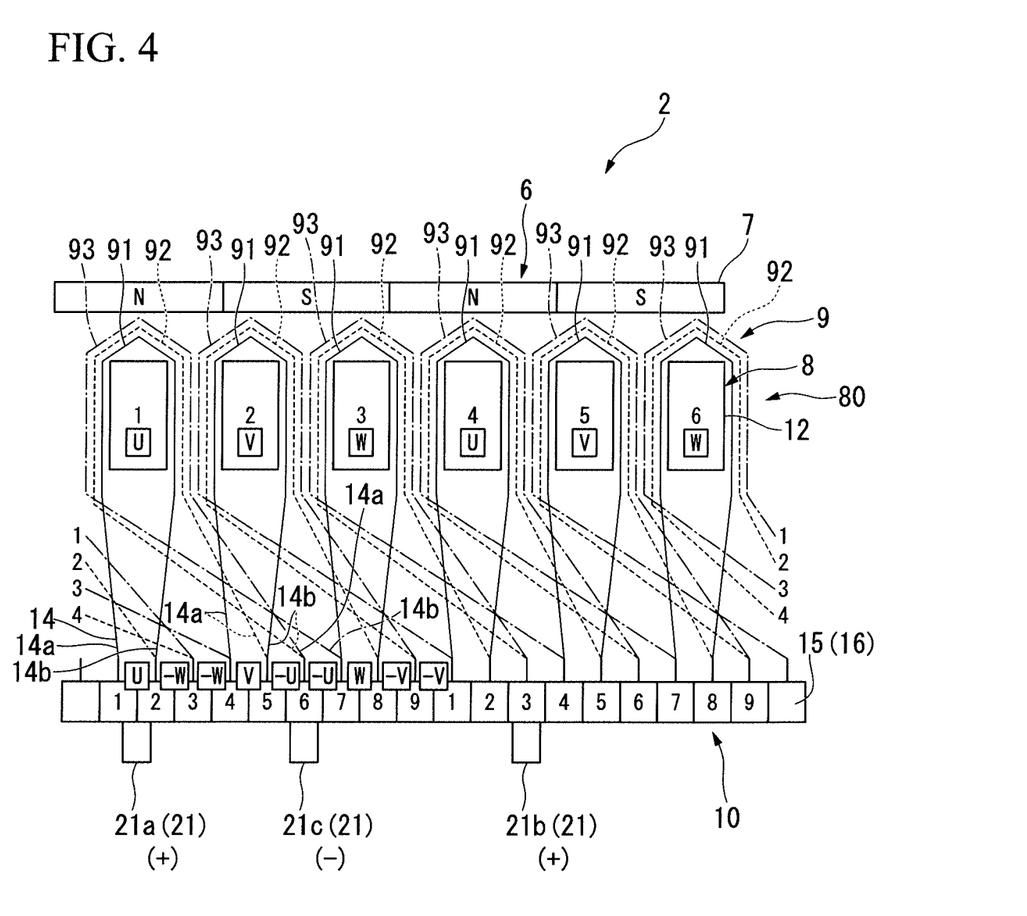
FIG. 4 is a development view of the armature of the embodiment of the invention.

FIG. 4 is a development view of the armature. A gap between the adjacent teeth corresponds to the slot. FIG. 5 is a view showing the winding direction of the winding wire and is a view showing the armature from the rear side on which the commutator is not disposed. Meanwhile, each segment 15, each tooth 12, and the formed armature coil 9 will be described by denoting reference numerals in FIG. 4. Here, among the eighteen segments 15, the segments which are disposed at positions opposite to each other by 180°, (the segments 15 having the same electric potential) are electrically connected to each other by a connecting wire (not shown) or the like. Accordingly, the segments 15 which have the same condition with respect to the brush are denoted by the same reference numerals of 1 to 9.

As shown in FIGS. 4 and 5, a U phase, a V phase, and a W phase are assigned to each tooth 12 in this order in the circumferential direction. That is, the first tooth 12 and the fourth tooth 12 correspond to a U phase, the second tooth 12 and the fifth tooth 12 correspond to a V phase, and the third tooth 12 and the sixth tooth 12 correspond to a W phase. Here, among the numbers given to the segments 15, the position corresponding to the first is regarded as a position corresponding to the first tooth 12.

Also, in FIG. 4, a direction in which the winding wire 14 is wound on each tooth 12 clockwise will be described as a forward direction and a direction in which the winding wire 14 is wound on each tooth 12 counterclockwise will be described as a reverse direction.

First, for example, in a case in which a winding start end 14a of the winding wire 14 starts to be wound from the first segment 15, the winding wire 14 is led into the slot 13 between the first and sixth teeth 12 existing near the first segment 15. Further, the winding wire 14 is wound on each tooth 12 in the forward direction in a concentrated winding manner.

Subsequently, the winding wire 14 is led out of the slot 13 between the first and second teeth 12, and is wound around the riser 16 of the second segment 15 adjacent to the first segment 15. Then, a winding terminal end 14b is connected to the second segment 15. Accordingly, a U-phase first coil 91, which is wound on the first tooth 12 in the forward direction, is formed between the first and second segments 15.

Further, the winding wire 14 of which the winding start end 14a is wound around the riser 16 of the fifth segment 15 is led into the slot 13 between the first and second teeth 12. Then, the winding wire 14 is wound on the first tooth 12 in the reverse direction in a concentrated winding manner.

Subsequently, the winding wire 14 is led out of the slot 13 between the first and sixth teeth 12, and is wound around the riser 16 of the sixth segment 15 adjacent to the fifth segment 15. Then, the winding terminal end 14b is connected to the sixth segment 15. Accordingly, a "−U"-phase second coil 92, which is wound on the first tooth 12 in the reverse direction, is formed between the fifth and sixth segments 15.

In addition, the winding wire 14 of which the winding start end 14a is wound around the riser 16 of the sixth segment 15 is led into the slot 13 between the first and second teeth 12. Then, the winding wire 14 is wound on the first tooth 12 in the reverse direction in a concentrated winding manner.

Subsequently, the winding wire 14 is led out of the slot 13 between the first and sixth teeth 12, and is wound around the riser 16 of the seventh segment 15 adjacent to the sixth segment 15. Then, the winding terminal end 14b is connected to the seventh segment 15. Accordingly, a "–U"-phase third coil 93, which is wound on the first tooth 12 in the reverse direction, is formed between the sixth and seventh segments 15.

Therefore, the armature coil 9, which includes the U-phase first coil 91, the "–U"-phase second coil 92, and the "–U"-phase third coil 93, is formed on the first tooth 12 corresponding to a U phase. The U-phase first coil 91 is formed of the winding wire 14 that is wound in the forward direction; and the "–U"-phase second coil 92 and the "–U"-phase third coil 93 are formed of the winding wires 14 that are wound in the reverse direction.

Then, when this is sequentially performed between the segments 15 corresponding to the respective phases, the armature coil 9 having a 3-phase structure including the first coil 91, the second coil 92, and the third coil 93 is formed on the armature core 8. Accordingly, the coils 91 to 93, which correspond to a U phase, a "–W" phase, a "–W" phase, a V phase, a "–U" phase, a "–U" phase, a W phase, a "–V" phase, and a "–V" phase, are electrically and sequentially connected in this order between the adjacent segments 15.

Meanwhile, at portions where the winding start end 14a and the winding terminal end 14b of the winding wire 14, which forms the coils 91 to 93 corresponding to the respective phases, are connected to the segments 15, the coils 91 to 93, which correspond to a U phase, a "–W" phase, a "–W" phase, a V phase, a "–U" phase, a "–U" phase, a W phase, a "–V" phase, and a "–V" phase, may be electrically and sequentially connected in this order between the adjacent segments 15.

Generally speaking, in a case in which a total of the number of turns of the first coil 91 wound on each tooth 12, the number of turns of the second coil 92 wound on each tooth 12, and the number of turns of the third coil 93 wound on each tooth 12 (the total number of turns of the winding wire 14) is denoted by n (n is a natural number that is a multiple of 3), the number of turns of each of the three coils, that is, the first, second, and third coils 91, 92, and 93 is set to "n/3". However, in this embodiment, the number of turns of one coil is set to be smaller than the number of turns of each of the other two coils under a condition in which the total number of turns of the coils, that is, n is maintained constant. Here, the operation of the electric motor 2 will be described, prior to the description of the setting of the number of turns of each coil.

(Operation of Electric Motor)

A case in which a voltage is applied to the low-speed brush 21a among the two anode brushes (the low-speed brush 21a and the high-speed brush 21b) will be described in regard to the description of the operation of the electric motor 2.

For example, in a case in which the low-speed brush 21a is disposed between the first and second segments 15 and the common brush 21c is disposed on the sixth segment 15 as shown in FIG. 4, the U-phase first coil 91 short-circuits.

Then, current flows in the "–U"-phase second coil 92 in the reverse direction (a counterclockwise direction in FIG. 4), and current flows in the "–U"-phase third coil 93 in the forward direction (a clockwise direction in FIG. 4). That is, since the direction of current flowing in the second coil 92 and the direction of current flowing in the third coil 93 are opposite to each other, a magnetic field is cancelled and torque is not generated with the motor magnet 7.

In contrast, current flows in the V-phase first coil 91, the "–V"-phase second coil 92, and the "–V"-phase third coil 93 in the forward direction. Further, current flows in the "–W"-phase first coil 91, the "–W"-phase second coil 92, and the "–W"-phase third coil 93 in the reverse direction.

Accordingly, a magnetic field is formed on each of the second, third, fifth, and sixth teeth 12. The directions of these magnetic fields are in series in the circumferential direction. For this reason, a magnetic attractive force or a repelling force between the magnetic field formed on each tooth 12 and the motor magnet 7 acts in the same direction at symmetrical positions with respect to the rotating shaft 3 as a center. Then, the rotating shaft 3 is rotated by the magnetic attractive force or the repelling force. Additionally, when a voltage is applied to the high-speed brush 21b, since the high-speed brush 21b has been advanced, the rotating shaft 3 is rotated at a high speed as that much.

(Reason why Advance-Angle Coil and Delay-Angle Coil are Generated)

Next, the change in three coils 91, 92, and 93 of each tooth 12, which is caused by the rotation of the armature 6, will be described.

Here, a case in which a voltage is applied to the low-speed brush 21a of which the position of the brush 21 is not advanced will be described in the following description. Further, among three phases, a U phase will be described as a representative. However, the same applies to the other phases.

Figure 6:
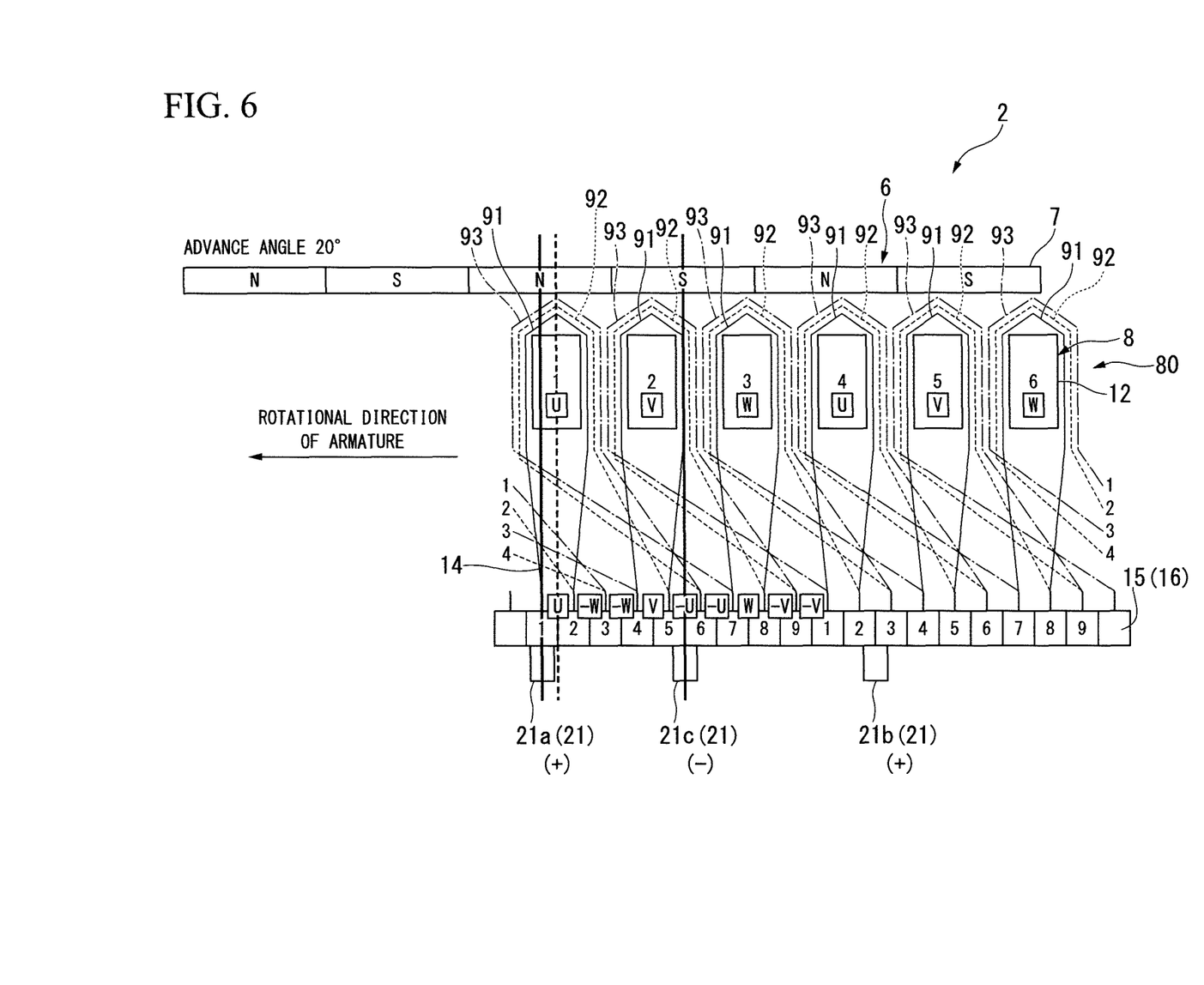
FIG. 6 is a development view when an advance angle of the armature of the embodiment of the invention is 20°.

When the armature 6 is rotated and is in a state shown in FIG. 6, the second coil 92 provided between the fifth and sixth segments is short-circuited by the brush 21. In this case, the tooth 12 corresponding to a U phase is present at a position that deviates by an electrical angle of 20° from a position where the advance angle is 0° (a position where the tooth 12 directly faces a magnetic pole).

Accordingly, a magnetomotive force vector of the advance angle 20° is generated on the tooth 12 corresponding to a U phase.

Figure 7:
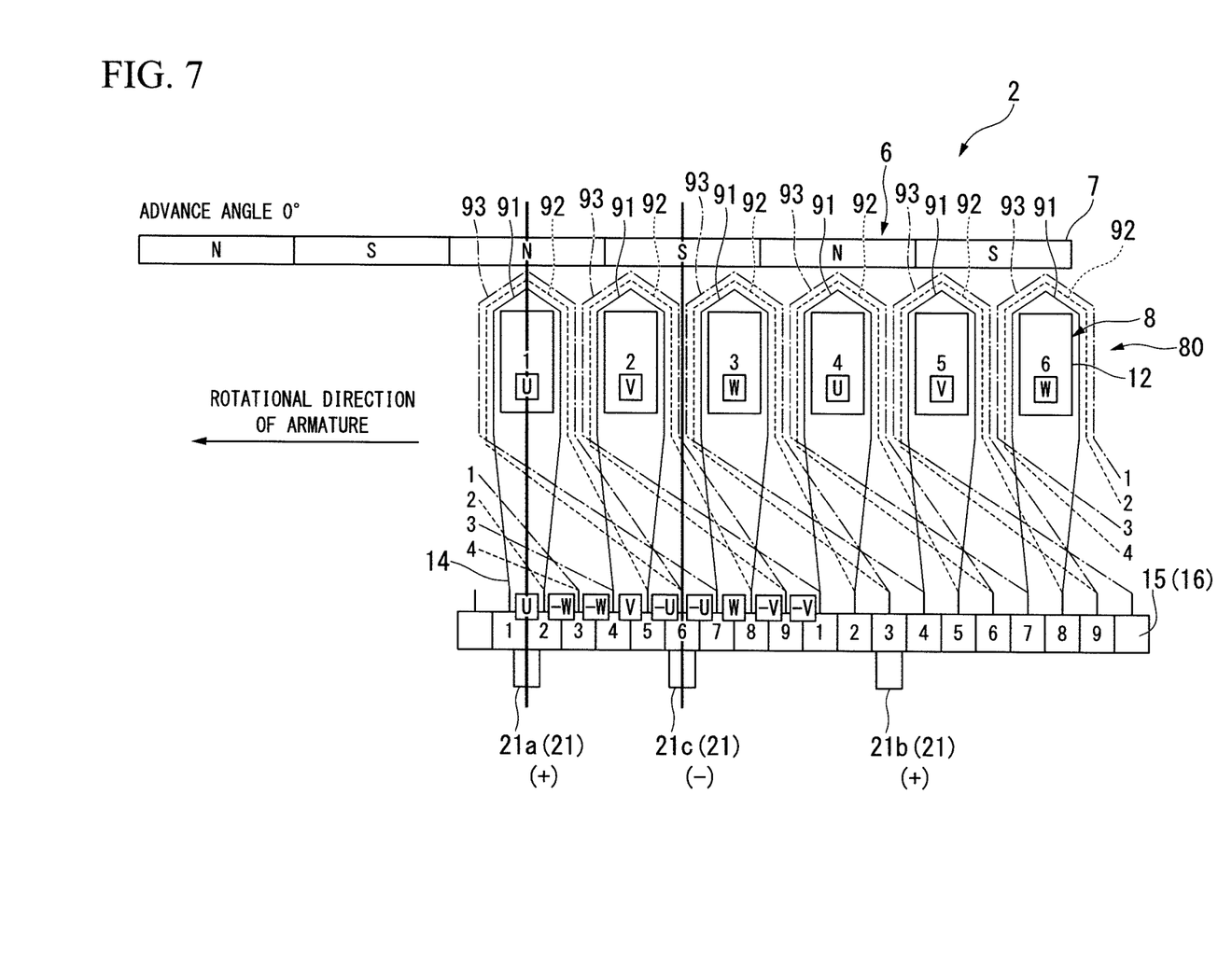
FIG. 7 is a development view when the advance angle of the armature of the embodiment of the invention is 0°.

Next, when the armature 6 is rotated and is in a state shown in FIG. 7, the first coil 91 provided between the first and second segments short-circuits. In this case, the tooth 12 corresponding to a U phase is present at a position where the advance angle is 0°, and rectification is performed at the position. Accordingly, a magnetomotive force vector of the advance angle 0° is generated on the tooth 12 corresponding to a U phase.

Figure 8:
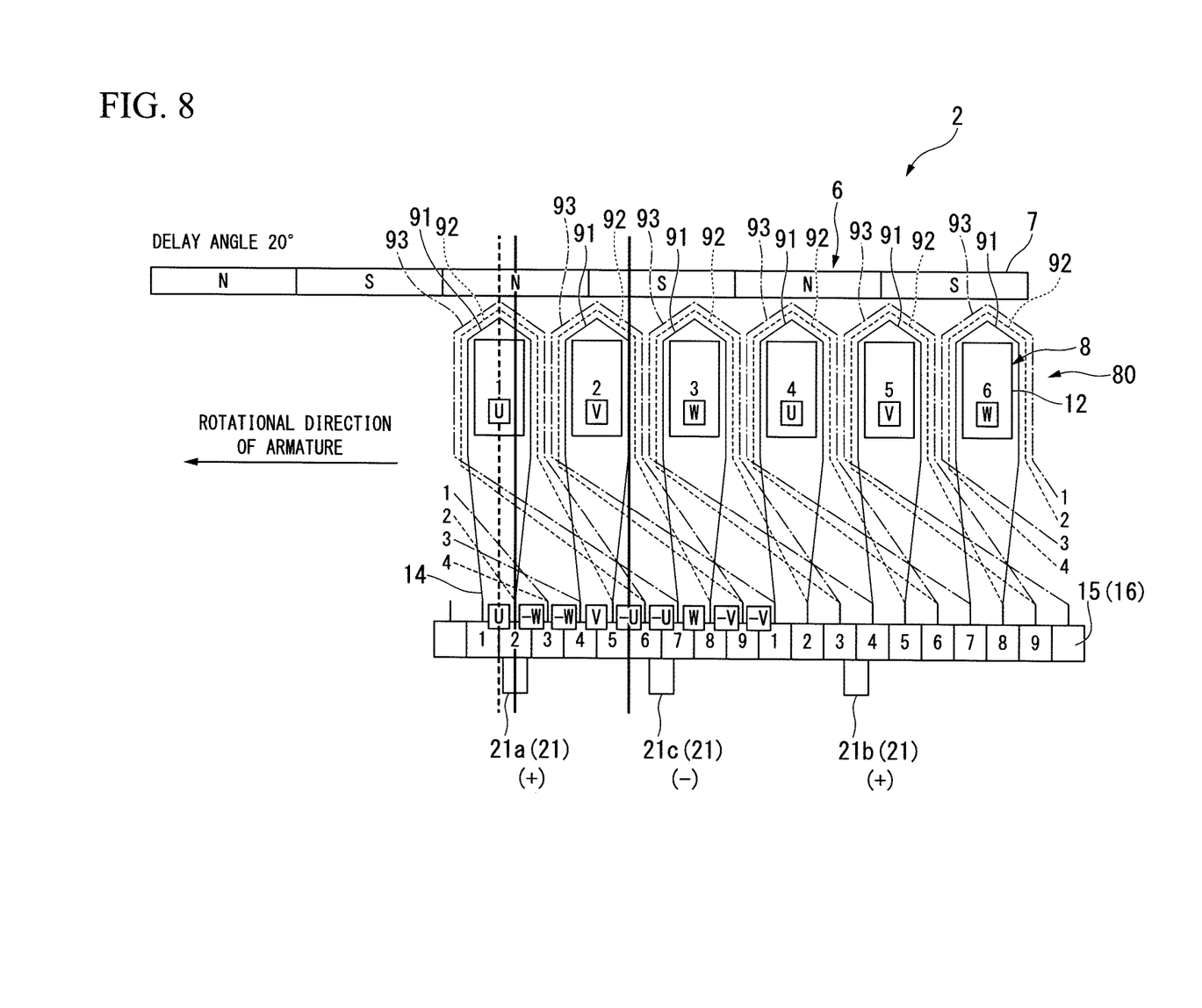
FIG. 8 is a development view when the delay angle of the armature of the embodiment of the invention is 20°.

After that, when the armature 6 is rotated and is in a state shown in FIG. 8, the third coil 93 provided between the sixth and seventh segments short-circuits. In this case, the tooth 12 corresponding to a U phase is present at a position where the delay angle is 20°, and rectification is performed at the position. Accordingly, a magnetomotive force vector of the delay angle 20° is generated on the tooth 12 corresponding to a U phase.

When the function of the winding wire 14 forming the coils 91 to 93 corresponding to the respective phases is examined in consideration of the above-mentioned description, it is understood that, among three coils (one forward winding coil 91 and two reverse winding coils 92 and 93) wound on each tooth 12, one coil is a 0°-advance-angle coil (a normal coil) that generates a magnetomotive force vector having no advance angle, another coil is a 20°-advanceangle coil (an advance-angle coil) that generates a magnetomotive force vector of the advance angle 20°, and the other coil is a 20°-delay-angle coil (a delay-angle coil) that generates a magnetomotive force vector of the delay angle 20°.

The classification of the coils is shown in Table 1. "SEG" shown in Table 1 is the abbreviation for the segment.

TABLE 1

| 0°-ADVANCE-ANGLE COIL | WINDING WIRE CONNECTED BETWEEN FIRST AND SECOND SEG | WINDING WIRE CONNECTED BETWEEN FOURTH AND FIFTH SEG | WINDING WIRE CONNECTED BETWEEN SEVENTH AND EIGHTH SEG |
|---|---|---|---|
| 20°-ADVANCE-ANGLE COIL | WINDING WIRE CONNECTED BETWEEN FIFTH AND SIXTH SEG | WINDING WIRE CONNECTED BETWEEN EIGHTH AND NINTH SEG | WINDING WIRE CONNECTED BETWEEN SECOND AND THIRD SEG |
| 20°-DELAY-ANGLE COIL | WINDING WIRE CONNECTED BETWEEN SIXTH AND SEVENTH SEG | WINDING WIRE CONNECTED BETWEEN NINTH AND FIRST SEG | WINDING WIRE CONNECTED BETWEEN THIRD AND FOURTH SEG |

When three coils 91, 92, and 93 perform the movement of the advance angle 20°, the movement of the advance angle 0°, and the movement of the delay angle 20° as described above, there is a concern that rectification performance may be adversely affected by the discordance of the magnetomotive force vectors as described above. Accordingly, in the electric motor 2 of this embodiment, the number of turns of each of the coils 91, 92, and 93 varies. That is, when the number of turns (the number of turns of the winding wire 14) of the 20°-advance-angle coil is denoted by T1, the number of turns of the 0°-advance-angle coil is denoted by T2, and the number of turns of the 20°-delay-angle coil is denoted by T3, a relationship of T1, T2, and T3 is set as described below.

$$T2 > T1 > T3 \quad (1)$$

The relationship of T1, T2, and T3 is determined under a condition of "T1+T2+T3=constant".

Figure 9:
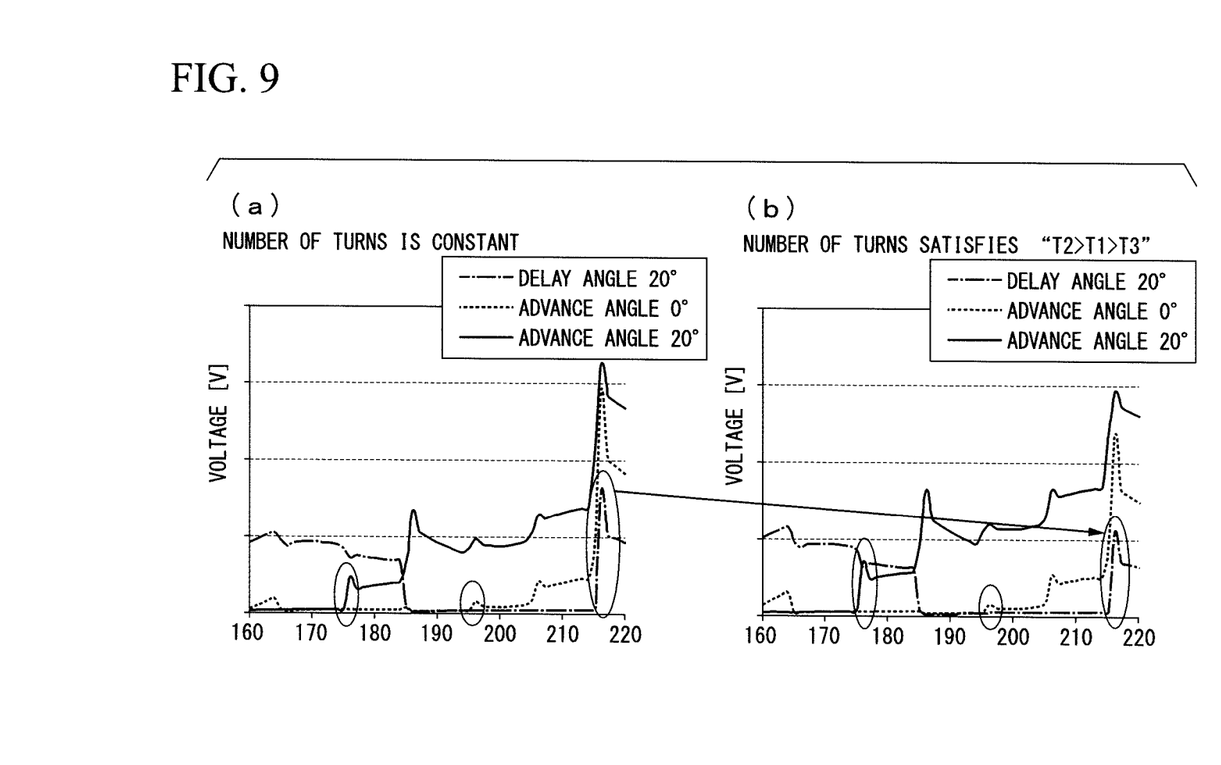
FIG. 9 is a diagram showing the comparison of characteristics according to a difference in the number of turns of a coil of the embodiment of the invention.

Through the variation of the number of turns of each of the three coils 91, 92, and 93 as described above, it is confirmed that a voltage between the segments of the 20°-delay-angle coil, which has a possibility that performance may be particularly affected (for example, reduction in the lifespan of the brush), is lowered as shown in FIGS. 9A and 9B.

Incidentally, the above-mentioned condition (1) corresponds to the case of the low-speed brush 21a of which the position of the brush 21 is not advanced, and it is understood that the condition (1) needs to be changed according to the magnitude of the advance angle when the position of the low-speed brush 21a is advanced. Accordingly, the following conditions can be obtained.

The advance angle θ of the low-speed brush 21a is set as follows:

(1) In a case in which "0°≤θ≤3°" is satisfied, "T2>T1>T3" is satisfied.

(2) In a case in which "3°<θ≤10°" is satisfied, "T2>T3>T1" is satisfied.

(3) In a case in which "θ=20°" is satisfied, "T3>T2>T1" is satisfied.

Meanwhile, an advance angle is set at the position of the high-speed brush 21b from the first, but the frequency of use of the advance angle is lower than that of an advance angle set at the position of the low-speed brush 21a. Accordingly, the above-mentioned conditions are set on the basis of the low-speed brush 21a.

(Effects)

Therefore, according to the above-mentioned embodiment, in the electric motor 2 in which three coils 91, 92, and 93 are formed on each tooth 12, the number of turns of one coil among the three coils 91, 92, and 93 is set to be smaller than the number of turns of each of the other two coils. Accordingly, it is possible to reduce an influence of the deterioration of rectification performance that is caused by the discordance of the magnetomotive force vectors generated by the three coils 91, 92, and 93 wound on each tooth 12. Further, it is possible to lengthen the lifespan of the brushes by the improvement of rectification.

Particularly, it is possible to reliably reduce an influence of the deterioration of rectification performance by setting the condition of the number of turns of each of the coils 91, 92, and 93 to the above-mentioned conditions (1) to (3) according to the position of the low-speed brush 21a. Accordingly, it is possible to lengthen the lifespan of the brushes.

Meanwhile, the invention is not limited to the above-mentioned embodiment, and also includes various modifications of the above-mentioned embodiment without departing from the scope of the invention.

For example, a case in which the structure of the three coils 91, 92, and 93 is applied to the electric motor 2 of the motor 1 with a speed reducer that is used to drive windshield wipers of an automobile has been described in the above-mentioned embodiment. However, the invention is not limited to the embodiment, and the structure of the three coils 91, 92, and 93 can be applied to various electric motors in which three coils are formed on each tooth.

Further, a case in which the brush 21 includes three brushes, that is, the low-speed brush (the anode brush) 21a, the high-speed brush (the anode brush) 21b, and the common brush (the cathode brush) 21c has been described in the above-mentioned embodiment. However, the invention is not limited to the embodiment, and the structure of the three coils 91, 92, and 93 can also be applied to an electric motor in which an anode brush and a cathode brush are provided so as to make a pair.

INDUSTRIAL APPLICABILITY

According to the electric motor, since the number of turns of one coil is set to be smaller than the number of turns of each of the other two coils, it is possible to reduce an influence of the deterioration of rectification performance that is caused by the discordance of the magnetomotive force vectors generated by three coils. Further, it is possible to lengthen the lifespan of the brushes by the improvement of rectification.

REFERENCE SIGNS LIST

1: motor with speed reducer
2: electric motor
6: armature
7: motor magnet
8: armature core
9: armature coil
10: commutator
15: segment
12: teeth
13: slot 21: brush
91, 92, 93: coil

The invention claimed is:
1. An electric motor comprising:
a motor magnet in which a plurality of magnetic poles are arranged in a circumferential direction;
a rotating shaft that is rotatably provided inside the motor magnet;
an armature core that is mounted on the rotating shaft and includes a plurality of teeth radially extending outward in a radial direction and a plurality of slots formed between the teeth;
coils that are wound on each of the teeth in a concentrated winding manner;
a commutator which is provided so as to rotate integrally with the rotating shaft and on which a plurality of segments are disposed in the circumferential direction; and
an anode brush and a cathode brush that supply power to the coils through the segments,
wherein three coils are wound on each of the teeth,
a number of turns of one coil among the three coils is set to be smaller than a number of turns of each of the other two coils,
the three coils are an advance-angle coil of which a magnetomotive force vector is directed to an advance-angle side, a delay-angle coil of which a magnetomotive force vector is directed to a delay-angle side, and a normal coil of which a magnetomotive force vector is not directed to either the advance-angle side or the delay-angle side, and
when the number of turns of the advance-angle coil is denoted by T1, the number of turns of the normal coil is denoted by T2, and the number of turns of the delay-angle coil is denoted by T3,
in a case in which,
an advance angle $\theta 1$ of the magnetomotive force vector of the advance-angle coil satisfies $0°<\theta 1 \leq 20°$,
a delay angle $\theta 2$ of the magnetomotive force vector of the delay-angle coil satisfies $0°<\theta 2 \leq 20°$, and
an advance angle $\theta 3$ of a position of the anode brush satisfies $0° \leq \theta 3 \leq 3°$,
T1, T2, and T3 are set so as to satisfy T2>T1>T3.
2. The electric motor according to claim 1,
wherein the number of the magnetic poles is set to four, the number of the slots is set to six, and the number of the segments is set to eighteen,
the three coils wound on each tooth are formed of one forward winding coil that is wound in a forward direction and two reverse winding coils wound in a reverse direction,
when a U phase, a V phase, and a W phase are assigned to each tooth in this order in the circumferential direction, the forward winding coils wound to the respective phases are respectively referred to as a U phase, a V phase, and a W phase, and the reverse winding coils wound to the respective phases are respectively referred to as a −U phase, a −V phase, and a −W phase,
the coils of the U phase, the −W phase, the −W phase, the V phase, the −U phase, the −U phase, the W phase, the −V phase, and the −V phase are electrically connected in this order between the adjacent segments, and
the number of turns of one coil among the one forward winding coil and the two reverse winding coils, which are wound, is set to be smaller than the number of turns of each of the other two coils.
3. An electric motor comprising:
a motor magnet in which a plurality of magnetic poles are arranged in a circumferential direction;
a rotating shaft that is rotatably provided inside the motor magnet;
an armature core that is mounted on the rotating shaft and includes a plurality of teeth radially extending outward in a radial direction and a plurality of slots formed between the teeth;
coils that are wound on each of the teeth in a concentrated winding manner;
a commutator which is provided so as to rotate integrally with the rotating shaft and on which a plurality of segments are disposed in the circumferential direction; and
an anode brush and a cathode brush that supply power to the coils through the segments,
wherein three coils are wound on each of the teeth,
a number of turns of one coil among the three coils is set to be smaller than a number of turns of each of the other two coils,
the three coils are an advance-angle coil of which a magnetomotive force vector is directed to an advance-angle side, a delay-angle coil of which a magnetomotive force vector is directed to a delay-angle side, and a normal coil of which a magnetomotive force vector is not directed to either the advance-angle side or the delay-angle side, and
when the number of turns of the advance-angle coil is denoted by T1, the number of turns of the normal coil is denoted by T2, and the number of turns of the delay-angle coil is denoted by T3,
in a case in which
an advance angle $\theta 1$ of the magnetomotive force vector of the advance-angle coil satisfies $0°<\theta 1 \leq 20°$,
a delay angle $\theta 2$ of the magnetomotive force vector of the delay-angle coil satisfies $0°<\theta 2 \leq 20°$ and
an advance angle $\theta 3$ of a position of the anode brush satisfies $3°<\theta 3 \leq 10°$,
T1, T2, and T3 are set so as to satisfy T2>T3>T1.
4. The electric motor according to claim 3,
wherein the number of the magnetic poles is set to four, the number of the slots is set to six, and the number of the segments is set to eighteen,
the three coils wound on each tooth are formed of one forward winding coil that is wound in a forward direction and two reverse winding coils wound in a reverse direction,
when a U phase, a V phase, and a W phase are assigned to each tooth in this order in the circumferential direction, the forward winding coils wound to the respective phases are respectively referred to as a U phase, a V phase, and a W phase, and the reverse winding coils wound to the respective phases are respectively referred to as a −U phase, a −V phase, and a −W phase,
the coils of the U phase, the −W phase, the −W phase, the V phase, the −U phase, the −U phase, the W phase, the −V phase, and the −V phase are electrically connected in this order between the adjacent segments, and
the number of turns of one coil among the one forward winding coil and the two reverse winding coils, which are wound, is set to be smaller than the number of turns of each of the other two coils.
5. An electric motor comprising:
a motor magnet in which a plurality of magnetic poles are arranged in a circumferential direction;

a rotating shaft that is rotatably provided inside the motor magnet;

an armature core that is mounted on the rotating shaft and includes a plurality of teeth radially extending outward in a radial direction and a plurality of slots formed between the teeth;

coils that are wound on each of the teeth in a concentrated winding manner;

a commutator which is provided so as to rotate integrally with the rotating shaft and on which a plurality of segments are disposed in the circumferential direction; and an anode brush and a cathode brush that supply power to the coils through the segments, wherein three coils are wound on each of the teeth, a number of turns of one coil among the three coils is set to be smaller than a number of turns of each of the other two coils, the three coils are an advance-angle coil of which a magnetomotive force vector is directed to an advance-angle side, a delay-angle coil of which a magnetomotive force vector is directed to a delay-angle side, and a normal coil of which a magnetomotive force vector is not directed to either the advance-angle side or the delay-angle side, and when the number of turns of the advance-angle coil is denoted by T1, the number of turns of the normal coil is denoted by T2, and the number of turns of the delay-angle coil is denoted by T3 in a case in which
an advance angle $\theta 1$ of the magnetomotive force vector of the advance-angle coil satisfies $0°<\theta 1 \leq 20°$,
a delay angle $\theta 2$ of the magnetomotive force vector of the delay-angle coil satisfies $0°<\theta 2 \leq 20°$, and
an advance angle $\theta 3$ of a position of the anode brush satisfies $\theta 3 = 20°$, T1, T2, and T3 are set so as to satisfy T3>T2>T1.

6. The electric motor according to claim 5, wherein the number of the magnetic poles is set to four, the number of the slots is set to six, and the number of the segments is set to eighteen, the three coils wound on each tooth are formed of one forward winding coil that is wound in a forward direction and two reverse winding coils wound in a reverse direction, when a U phase, a V phase, and a W phase are assigned to each tooth in this order in the circumferential direction, the forward winding coils wound to the respective phases are respectively referred to as a U phase, a V phase, and a W phase, and the reverse winding coils wound to the respective phases are respectively referred to as a −U phase, a −V phase, and a −W phase, the coils of the U phase, the −W phase, the −W phase, the V phase, the −U phase, the −U phase, the W phase, the −V phase, and the −V phase are electrically connected in this order between the adjacent segments, and the number of turns of one coil among the one forward winding coil and the two reverse winding coils, which are wound, is set to be smaller than the number of turns of each of the other two coils.

* * * * *